May 15, 1951 S. GABRIELSON ET AL 2,553,309

GYRO-INDICATOR CONSTRUCTION

Filed Oct. 25, 1949 3 Sheets-Sheet 1

Inventors:
Samuel Gabrielson,
Edward E. Lynch,
by Burrell F. Mack
Their Attorney.

May 15, 1951  S. GABRIELSON ET AL  2,553,309
GYRO-INDICATOR CONSTRUCTION
Filed Oct. 25, 1949  3 Sheets-Sheet 2
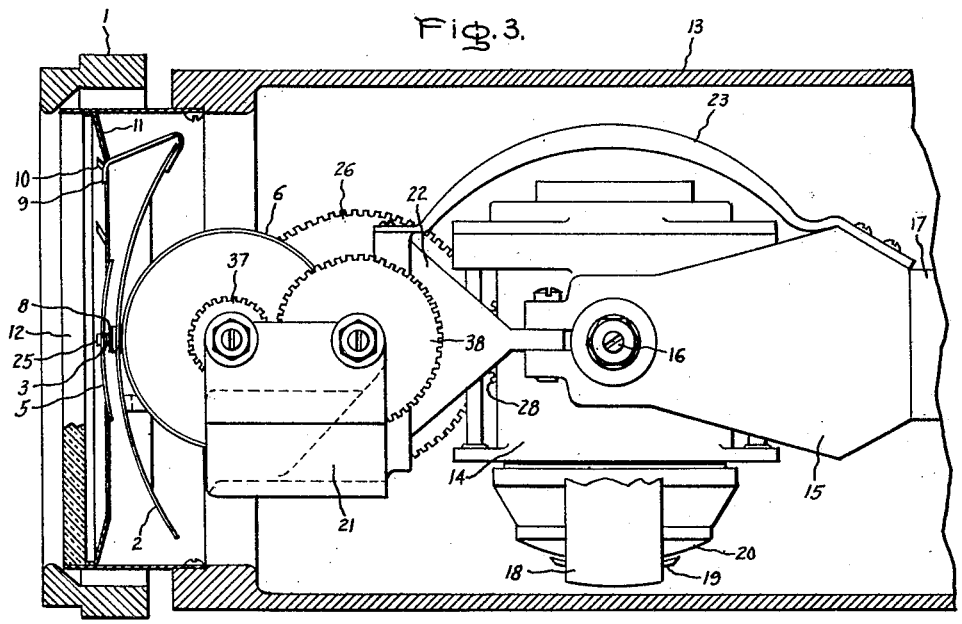
Fig. 3.
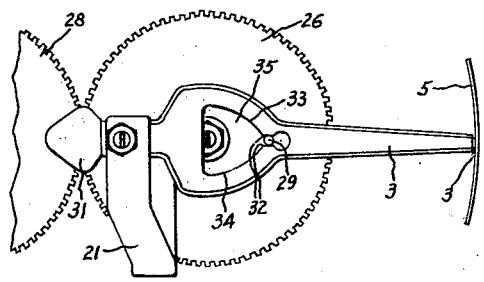
Fig. 4.
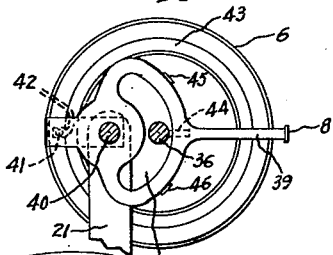
Fig. 5.
Fig. 13.
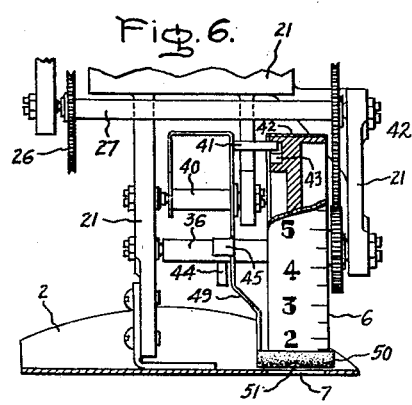
Fig. 6.
Inventors:
Samuel Gabrielson,
Edward E. Lynch,
by
Their Attorney.

May 15, 1951 — S. GABRIELSON ET AL — 2,553,309
GYRO-INDICATOR CONSTRUCTION

Filed Oct. 25, 1949 — 3 Sheets-Sheet 3

Inventors:
Samuel Gabrielson,
Edward E. Lynch,
by Graves & Mack
Their Attorney.

Patented May 15, 1951

2,553,309

UNITED STATES PATENT OFFICE 2,553,309

GYRO INDICATOR CONSTRUCTION

Samuel Gabrielson, South Lynnfield, and Edward E. Lynch, Wakefield, Mass., assignors to General Electric Company, a corporation of New York Application October 25, 1949, Serial No. 123,434

11 Claims. (Cl. 33—204)

The present invention relates to instrument indicators and, more particularly, to improved intelligence indicating systems for aircraft gyroscopic instruments.

Attitude indicators whose presentations of data to the observer may have proved satisfactory in relatively low velocity aircraft are, in many instances, not capable of producing indications of the requisite accuracy and clarity in high speed craft. It may be appreciated, for example, that dive angles of a magnitude so minute as to be of little immediate concern on a low speed aircraft may become of tremendous importance on a plane traveling at very high and near sonic speeds, and these dive angles must be rendered easily and clearly observable together with those indications representing greater attitude changes. Further it is advantageous to the rapid interpretation of the presentations of a horizon type gyroscopic instrument that these presentations accurately depict the appearance of the actual horizon during maneuvers to permit piloting in accordance with normal pilot responses, and yet it is likewise of advantage that the pilot also be afforded an exact indication of dive and climb angles when these must be relied upon. In accordance with the subject invention, the shortcomings of known instruments are eliminated by the provision of unique indicating systems which supply the required visual information with the desired degrees of accuracy and clarity.

It is, therefore, one object of the present invention to provide a horizon type gyroscopic instrument wherein high sensitivity dive and climb indications, lower sensitivity bank and dive and climb indications, and calibrated dive and climb angle indications are produced without ambiguity on a single dial face.

A second object is to provide a bank and climb gyroscope including a horizon bar and a high speed pointer which travels at a predetermined multiple of the horizon bar speed to produce accurate indications of small angles of dive and climb.

Further, it is an object to provide a gyro horizon having an improved indicator system wherein a high speed dive and climb indicator cooperates with a horizon bar indicator to depict magnified dive and climb angles of small magnitudes and wherein the high speed indicator cannot be actuated or observed beyond predetermined angles of travel.

An additional object is to provide an improved indicator system for gyro horizon instruments wherein a horizon bar and calibrated dive and climb angle cylindrical indicator are actuated responsive to movements of a craft with reference to a gyro and wherein a high speed dive and climb indicator is actuated by the cylindrical indicator to present magnified indications of small dive and climb angles only within predetermined limits.

The foregoing and other objects and features of this invention are disclosed in detail in the following description wherein reference is made to the accompanying drawings of preferred embodiments thereof, in which:

Figure 1 pictorially illustrates the face of a gyro horizon instrument embodying the present invention;

Figure 3 is a right side elevation, partly in section along the longitudinal axis of the instrument of Figures 1 and 2;

Figure 4 represents a partial pictorial left side view of the horizon bar and indicator mechanism taken in the direction of arrow 4 in Figure 2;

Figure 5 illustrates a partial sectionalized view of the high sensitivity pointer mechanism of Figure 2;

Figure 6 shows a partial sectionalized plan view of the indicator structure of another embodiment of the invention;

Figure 7:
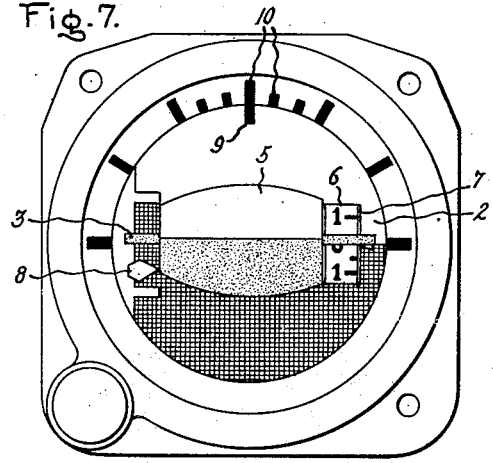
Figure 8:
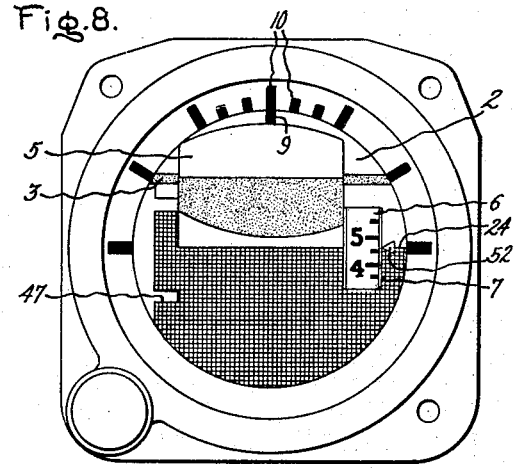
Figure 9:
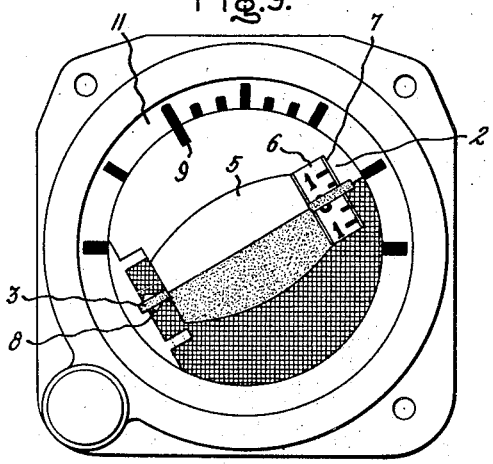
Figure 10:
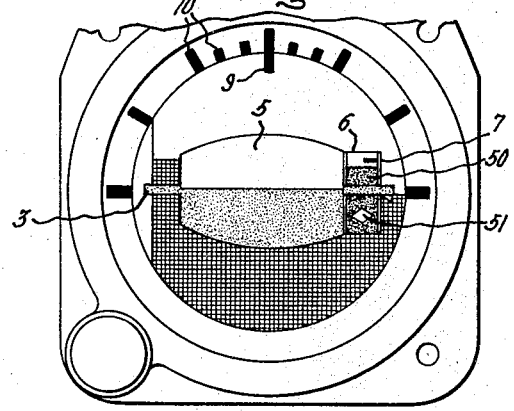
Figure 11:
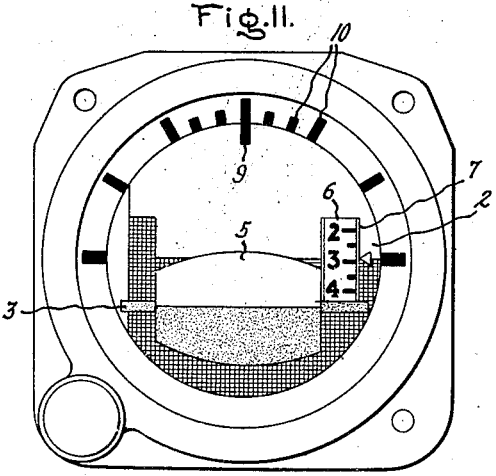
Figure 12:
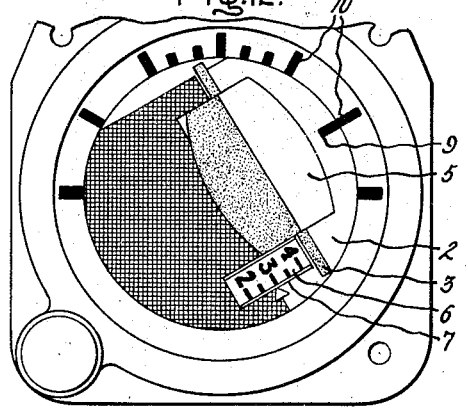

Figures 7 through 9 portray views of the instrument of Figures 1 through 5 while the supporting aircraft performs representative maneuvers;

Figures 10 through 12 portray face views of the instrument of Figure 6 while the supporting aircraft is orientated in predetermined attitudes; and Figure 13 is a detailed showing of a portion of the mechanism of Figure 5.

Figure 1:
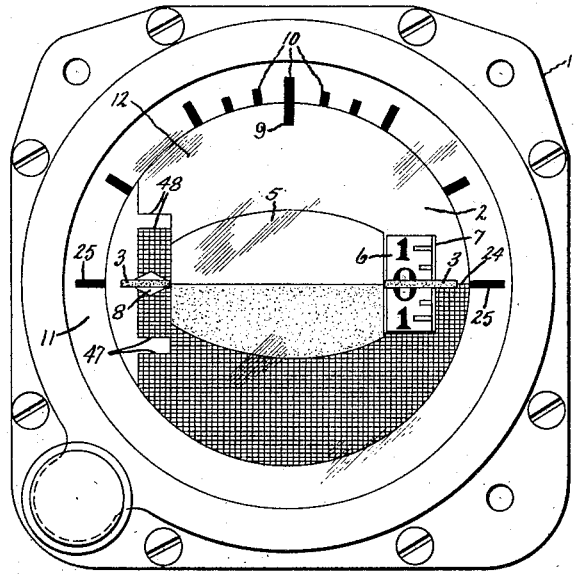

The artificial horizon instrument of which a face view is presented in Figure 1 includes the panel mounting flange 1, a sky plate 2, horizon bar 3, a horizon indicator plate 5 attached to and movable with horizon bar 3, a rotatable cylindrical drum 6 having numerals thereon which are visible through the rectangular aperture 7 of sky plate 2, a distinctively-shaped high sensitivity pointer 8 positioned intermediate the horizon bar and sky plate, a bank index 9 attached to sky plate 2, and indicia 10 on annular dial 11. Most of these elements and their relationships are further clearly depicted in Figures 2 and 3, behind the window 12, and the apparatus for actuating the movable components is also illustrated. Thus, within the outer casing or support 13 in these figures, the gyroscope motor bearing member or housing 14, enclosing a gyroscope rotor having a vertical spin axis and caused to rotate by appropriate motive means, not shown, is mounted for universal maneuverability within the yoke-like gimbal 15 by trunnions 16, and gimbal 15 is, in turn, freely rotatable about its supporting trunnion 17 aligned with the fore and aft craft axis. Erecting apparatus normally associated with this type of instrument has been largely omitted from the drawings to preserve clarity, although Figure 3 discloses a portion of a lower erecting gimbal 18 and erecting disk 19 cooperating with an erecting element 20 supported by the motor structure and rotatable with the gyro rotor.

It is, of course, appreciated by those skilled in the art that the rigidity in space of the gyro motor housing 14 results in orientations thereof with respect to the gimbal 15, during maneuvers of the supporting aircraft, which may be translated into indications of the aircraft attitudes. The present invention accomplishes such a translation of data in unique fashion to produce improved attitude indications which are readily observable and easily interpreted, including bank indications provided by index 9 and sky plate 2, dive and climb and bank indications provided by horizon bar 3 and horizon indicator plate 5, numerical indications of dive and climb angle provided by drum 6, and high sensitivity dive and climb indications over a reduced range provided by the pointer 8. The actuating mechanisms here involved are supported by a mounting structure 21 which is secured to the gimbal 15 for rotation therewith by the gimbal extensions 22 and the bracket 23 and which is a portion of the gimbal structure. Sky plate 2 is fixedly attached to this mounting structure 21 and is thus maintained locked in angular attitude while the aircraft and instrument casing and dial 11 may rotate about it. The index 9 fastened to sky plate 2 and the upper margin 24 of the distinctively shaded lower half of the sky plate therefore cooperate with the indicia 10 and 25 respectively on dial 11 to indicate the angle of bank. The upper and lower halves of the horizon plate 5 are of different distinctive colors and the lower half of plate 5 is of different color than the lower half of the sky plate 2.

Figure 2:
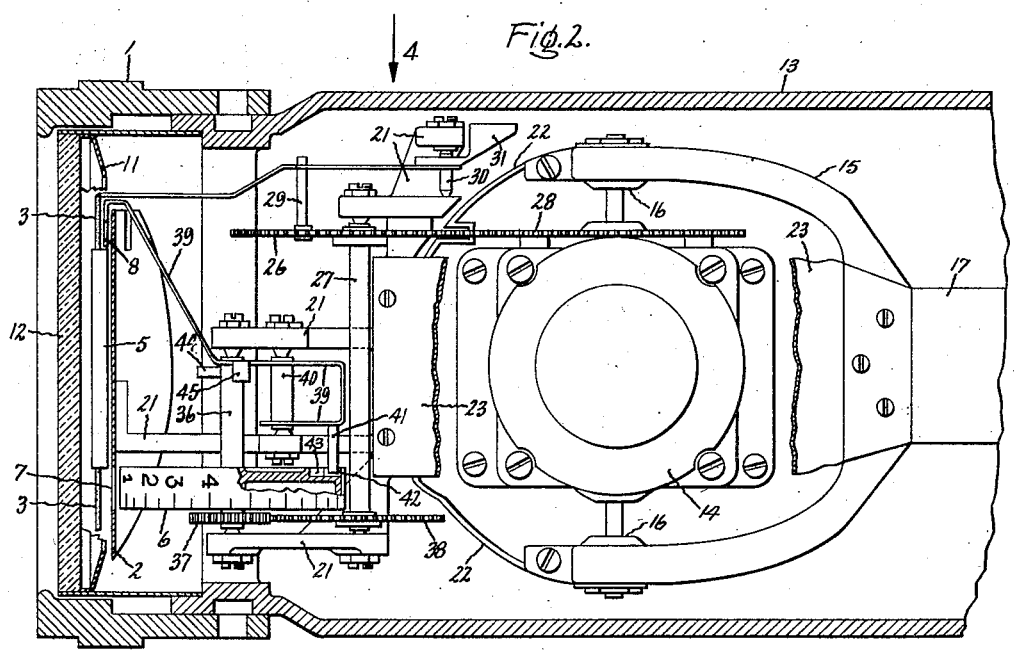
Figure 2 depicts, partly in section, a plan view of the instrument illustrated in Figure 1.

The angular displacements of gimbal 15 about trunnions 16 and with respect to motor housing 14 are representative of the dive and climb angles of the aircraft and are translated into movements of horizon bar 3 and horizon plate 5 before the face of the sky plate 2. In accomplishing this result, the circular gear 26, attached to the shaft 27 which is pivotally mounted on the mounting structure 21, engages the circular gear 28 affixed to the motor housing 14 and is caused to rotate about the longitudinal axis of shaft 27 when gimbal 15 and mounting structure 21 change their orientations with respect to the motor housing. Figure 2 shows the foregoing arrangement and also illustrates a horizon bar actuating pin 29 carried by gear 26 and extending through an opening in bar 3. Additional details of the horizon bar structure are disclosed in Figure 4 which is a view thereof taken in the direction of arrow 4 of Figure 2. Horizon bar 3 is shown to be rotatable with shaft 30, Figure 2, which is pivotally mounted in mounting structure 21, and a counterweight 31 attached to one end of bar 3 balances the masses of the horizon bar and horizon plate 5 on the opposite side of the pivot axis. As Figure 4 makes immediately apparent, rotation of gear 26 and its projecting pin 29 from the mid-position shown results in angular movement of horizon bar 3 about its shaft 30 due to the engagement between pin 29 and the narrow open-ended slot 32. It will be observed that the open-ends of slot 32 are each merged with one of the arcuate surfaces 33 and 34 which define boundaries of a larger opening 35 in the horizon bar; these surfaces are shaped such that when bar 3 has been elevated or lowered by engagement of pin 29 with slot 32 to a position at which the pin disengages the slot, the further movement of the pin beyond this position will impart no further elevating or lowering force to bar 3. Thus, the bar 3 and horizon plate 5 may be moved across the face of sky plate 2 to indicate dive and climb through a predetermined range of dive and climb angles and will remain stationary at the maximum angles of this range when dive or climb angles are in excess thereof, without mechanically interfering with instrument operation.

Dive and climb angle indications in a numerical presentation are achieved by the rotation of the cylindrical drum or dial 6, on the outer surface of which the angles and graduations thereof are marked for observation through the rectangular aperture 7 in the sky plate 2. Drum 6 is rotatable with its shaft 36 which is pivoted in mounting structure 21, the shaft 36 being rotated by gear 37, attached thereto, which is in turn rotated by gear 38 attached to shaft 27 which responds to changes in the orientations between the motor housing and mounting structure 21. The index with reference to which the dive and climb angles registered by the markings on drum 6 are read is provided by the upper margin 24 of the distinctively shaded lower half of the sky plate.

Additionally, the high sensitivity pointer 8 is disposed between the horizon bar 3 and the sky plate 2 on the side of horizon plate 5 opposite that near which the drum 6 is located. Pointer 8 is actuated by the pointer arm 39 which pivots about mounting structure 21 on shaft 40, and elevating and lowering movements of arm 39 are accomplished by movements of the pin or cam follower pin 41 projecting from the arm 39 on the side of shaft 40 opposite that on which the pointer 8 is fixed. Throughout its limited range of movement, the pin 41 is actuated by the drum or cam member 6 by virtue of its engagement with the sides of the open-ended radial cam slot 42 in the interior of the drum, and, beyond this range, further rotation of drums 6 is accompanied by riding of pin 41 in the annular cam slot 43 at which times no forces act to elevate or lower the pin and pointer 8 coupled therewith. This arrangement is most clearly illustrated in Figure 5, from which showing it is also evident that the gear driven shaft 36 is provided with a projecting pin 44 which cooperates with the two tabs 45 and 46 on pointer arm 39. Considering that the drum 6 moves counterclockwise from the position depicted in Figure 5, the sides of slot 42 force pin 41 counterclockwise together with the attached pointer 8 and arm 39, arm 39 being free to rotate because of the clearance afforded shaft 36 by the opening 47 in the pointer arm. Ultimately pin 41 leaves slot 42 and enters the annular channel or cam slot 43, and further rotation of the drum in the same direction is ineffective in producing movement of the pin 41 and pointer arm 39. Figure 13 illustrates the structure of the radial and annular slots, 42 and 43, in greater detail. Provision is also made, by way of pin 44 on shaft 36 and tab 46 on pointer arm 39, to insure that the pin 41 will re-enter slot 42 when the drum 6 thereafter rotates clockwise. At the point where pin 41 leaves slot 42 during the counterclockwise movement of drum 6 considered above, pin 44 has moved to a predetermined angle and tab 46 has moved, at a greater rate of travel, such that it just contacts this pin. Upon clockwise movement of drum 6 and the attached shaft 36 thereafter, the pin 44 contacts tab 46 and pushes arm 39 to cause pin 41 to re-enter the slot 42. Similar action involving tab 45 ensues upon clockwise and return motion of the drum. This arrangement has the distinct advantage that no resilient engagement between pin 41 and the drum 6 need be resorted to in order to insure the desired entry into slot 42, such resilient engagement being the source of frictional restraint upon the drum and being reflected upon the gyroscope as an undesirable precessing torque.

When the aircraft supporting the instrument of Figures 1 through 5 performs a diving maneuver, the rotor housing 14 will remain rigidly oriented about its trunnions 16 while the gimbal 15 and mounting structure 21 rotate clockwise as viewed in Figure 3. Gear 26 is caused to rotate clockwise because of its engagement with gear 28 on the rotor housing, and pin 29 thereon elevates the horizon bar 3 and horizon plate 5 with reference to sky plate 2 to depict a rising horizon which is representative of the dive maneuver. Simultaneously, shaft 27 and gear 38 coupled with gear 26 rotate clockwise also, with the result that gear 37 and the drum indicator 6 are rotated counterclockwise such that the numerals and graduations on the exterior of drum 6 indicate the dive angle when read through sky plate aperture 7 and with reference to the index 24. The high sensitivity pointer 8 is moved counterclockwise at the same time due to the motion imparted to pin 41 and arm 39 by the drum 6. Because the rate of angular travel of pointer 8 is rapid and the greatest utility of the pointer lies in its amplification of small dive and climb angles into large pointer displacements, provision is made to mask the pointer when its travel exceeds the small range where it is most useful, and, thereafter, the pointer is not visible to complicate reading of the instrument indications. Thus, the narrow slots 47 and 48 are provided on the sky plate 2 such that the pointer 8 may move through these slots and remain hidden behind the upper or lower portions of the sky plate after its useful range of movement has been exceeded. It should be observed that pointer 8 has been described as moving in a direction opposite to that in which the horizon bar 3 and the horizon plate 5 move and, while clarity of indications is enhanced somewhat by this arrangement, it is of course contemplated that these movements may all be in the same direction by the interposition of an additional gear between gears 38 and 37, or by rearrangement of the actuation of arm 39 by drum 6, or by the utilization of other apparent means. The speeds of travel of the horizon bar, drum, and high sensitivity pointer may be predetermined at desired magnitudes by the design of the gears and the proper location of the actuating pins and pivot axes.

Another preferred embodiment of this invention appears in Figure 6 wherein is provided a high sensitivity pointer which also masks the drum 6 as seen through aperture 7 until a predetermined angle of dive or climb has been exceeded. The instrument including the structure of this figure may be the same as that shown in Figure 2 with the exception of the high sensitivity pointer mechanism. Pointer arm 49 is of a construction similar to that of pointer arm 39 with the requisite modifications to permit its location in proximity with the drum 6, actuation thereof being provided by the pin 41 cooperating with the slot 42 and annular channel 43 in drum 6. At the front end of the pointer arm a cylindrical surface masking plate 50 is positioned for rotation between the drum 6 and sky plate 2, the arrangement being such that the plate 50 completely masks the drum as viewed through the aperture 7 when no dive or climb is experienced. Additionally, plate 50 is preferably provided with an index 51 which may be read through the aperture to yield a high sensitivity indication of dive and climb. This arrangement indicates, immediately upon observation, whether or not the aircraft is in a dive or climb of greater angles than those registered by the high sensitivity pointer, and the drum is not visible whenever the dive or climb angles are of such small magnitudes that the drum indications thereof are inconsequential.

In Figures 7 through 9 the face views of the instrument of Figures 1 through 5 are portrayed for predetermined orientations of the supporting aircraft. It should be noted in these figures that the lower half of the horizon plate 5 and the lower half of the sky plate 2 are distinctly shaded to present a much darker appearance than the upper portions thereof, the utility of such markings residing in their simulation of the appearance of the horizon during maneuvers, as will hereinafter be made clear. The aircraft dive of approximately 3 degrees results, in Figure 7, in a barely perceptible upward displacement of horizon bar 3 and plate 5, and no accurate indication is afforded by drum 6, while the high sensitivity pointer 8 has been lowered through a sizeable angle to represent the departure from horizontal flight. At the higher dive angle of 45 degrees, as depicted in Figure 8, the pointer 8 has disappeared behind the sky plate after traveling through slot 47, drum 6 indicates a 45 degree dive angle as read against the margin 24 or an index 52, and the horizon plate 5 has been elevated with horizon bar 3 to present to the observer a predominantly dark shaded dial face view which is immediately recognized as characterizing a high horizon and a steep dive angle. A 30 degree right bank maneuver results in the neutral or zero indication by all dial face members except the indicia on the sky plate 2 which cooperate with the indicia on annular dial 11 to register this bank angle, as shown by Figure 9.

Figures 10 through 12 illustrate face views of an instrument incorporating the high sensitivity pointer arrangement of Figure 6. Thus, Figure 10 is representative of a 3 degree dive, only a small portion of dial 6 being exposed while the index 51 has been noticeably lowered to depict this deviation from level flight. The 30 degree climb indications of Figure 11 show the cylindrical masking plate 50 to have uncovered the dial or drum 6 while itself obscured from view by the upper portion of sky plate 2, and the dial 6 discloses the climb angle while the horizon plate 5 has been so lowered that the overall appearance of the instrument face is predominantly of a light shade which denotes a lowered horizon and a climb attitude. In Figure 12 a 60 degree left bank and 30 degree dive are communicated to the observer, the bank by the position of sky plate index 9 with reference to indicia 10 on the annular dial 11, and the dive by the numerals on dial 6 and the elevated position of the horizon plate 5 with reference to the sky plate. Plate 50 remains hidden by the lower portion of the sky plate in this latter view.

It should be apparent that the present invention is susceptible of modification in numerous ways without departure from the spirit or scope thereof. As previously mentioned, the direction of movement of the pointer and drum indicators may be made to correspond to the direction of horizon bar travel where this is desirable. Further, the physical positioning of the drum and high sensitivity pointer and horizon bar actuating arm at positions on the dial face other than those illustrated may be accomplished without transcending the skill expected of one versed in the art. The design of horizon bar plate, high sensitivity pointer, and rotating dial configurations may, of course, be varied to satisfy specific requirements, and dial elements fewer than or more numerous than those disclosed may enter to the design of an instrument in accordance with this invention. Thus, no horizon plate might be employed, or drum 6 might not be utilized to provide indications and merely serve its cam function. Additionally, the indicating mechanisms herein disclosed may be responsive to means other than a gyro rotor housing relative to which the gimbal structure moves, and it is specifically contemplated that a pendulous device for establishing the vertical or a telemetering device responsive to a remote gyro may serve to actuate these mechanisms. The preferred embodiments set forth in the accompanying drawings are illustrative of gears actuating the horizon and dive and climb indicators, although other means such as chain, belt, or clutch driving means may be employed where the instrument design lends itself to the use of such apparatus.

While particular embodiments of the subject invention have been shown and described herein, these are in the nature of description rather than limitation and it will occur to those skilled in the art that various changes, modifications, and combinations may be made within the province of the appended claims without departing in spirit or scope from this invention in its broader aspects.

What we claim as new and desire to secure by Letters Patent of the United States is:

1. An artificial horizon instrument for aircraft, comprising an outer casing, a gimbal structure pivotally supported within said casing along the fore and aft axis thereof, a gyro rotor and rotor bearing member pivotally mounted along a transverse axis of said gimbal structure, a first gear positioned by said rotor bearing member, a sky plate affixed to said gimbal structure, a second gear pivotally mounted on said structure and engaging said first gear, a horizon bar member pivoted on said structure, a horizon plate positioned for movements before said sky plate by said horizon bar member, a pin extending from said second gear substantially parallel with the pivot axis thereof and actuating said horizon bar member, a substantially cylindrical dial pivotally mounted on said structure and having indicia on the exterior thereof visible through an aperture in said sky plate, means responsive to movements of said second gear for rotating said dial, a high sensitivity pointer arm pivoted on said structure and having a pointer at one end thereof between said sky plate and horizon bar and an actuating pin having a relatively short moment arm from the pivot axis of said pointer arm, and a cam arrangement rotatable with the pivot axis of said dial and including a radial cam slot having an open end merging with an annular cam slot, said pointer arm being positioned such that said pointer arm pin is engaged by one of said cam slots.

2. An artificial horizon instrument for aircraft, comprising an outer casing, a gimbal structure pivotally supported within said casing along the fore and aft axis thereof, a gyro rotor bearing member pivotally mounted along a transverse axis of said gimbal structure, a first gear positioned by said rotor bearing member, a sky plate affixed to said gimbal structure, a second gear pivotally mounted on said structure and engaging said first gear, a horizon bar member pivoted on said structure and adapted to move a horizon bar before said sky plate, a pin extending from said second gear parallel with the pivot axis thereof and actuating said horizon bar member, a cam member pivotally mounted on said structure, said cam member having an annular cam slot concentric with the pivot axis thereof and a radial cam slot having an open end merging with said annular slot, means for rotating said cam responsive to movements of said second gear, a high sensitivity pointer arm pivoted on said structure for actuating a pointer before said sky plate, a cam follower attached to said pointer arm at a short moment arm from the pivot axis thereof, said cam follower being engaged with one of said cam slots.

3. An artificial horizon instrument comprising a gimbal structure mounted to pivot about a first axis, a gyro rotor bearing member mounted on said structure to pivot about a second axis perpendicular to said first axis, a first gear positioned by said rotor bearing member, a cam member pivotally mounted on said structure, said cam member having an annular cam slot concentric with the pivot axis thereof and a radial slot having an open end merging with said annular slot, gear means on said structure actuated by said first gear for rotating said cam member, a pointer arm pivotally mounted on said gimbal structure and having a pointer on one end thereof, a cam follower attached to said pointer arm and engaging sides of said radial slot during a predetermined range of angular displacements between said gimbal structure and said rotor bearing member and engaging sides of said annular slot when said range is exceeded, a pin member rotatable with said cam, and a pair of tabs on said pointer arm, each tab being positioned to be pushed by said pin member to rotate said pointer arm to a position where said cam follower will be forced into said radial slot.

4. An artificial horizon instrument comprising a gimbal structure mounted to pivot about a first axis, a gyro rotor bearing member mounted on said structure to pivot about a second axis perpendicular to said first axis, a first gear positioned by said rotor bearing member, a cylindrical dial member pivotally mounted on said structure, said dial member having a cam portion in which are located an annular cam slot concentric with the pivot axis of said dial member and a radial slot having an open end merging with said annular slot, gear means on said structure actuated by said first gear for rotating said dial member, a pointer arm pivotally mounted on said gimbal structure and having a pointer on one end thereof, a cam follower attached to said pointer arm and positioned to be actuated by the sides of said radial slot when said gimbal structure and rotor bearing member are angularly oriented within a predetermined range and to be held fixed in position by the sides of said annular slot when said range is exceeded, a pin member rotatable with said dial member, a pair of tabs on said pointer arm, each tab being positioned to be pushed by said pin member to rotate said pointer arm to a position where said cam follower will be forced into said radial slot when said structure and bearing member return to within said range of displacements, a sky plate positioned on said gimbal structure as a background for said pointer and having an aperture therein through which dive and climb angle markings on said dial member are visible.

5. An artificial horizon instrument comprising a gimbal structure mounted to pivot about a first axis, a gyro rotor bearing member mounted in said structure to pivot about a second axis perpendicular to said first axis, a first gear positioned by said rotor bearing member, a cylindrical dial member pivotally mounted on said structure, said dial member having a cam portion in which are located an annular cam slot concentric with the pivot axis of said dial member and a radial slot having an open end merging with said annular slot, gear means on said structure actuated by said first gear for rotating said dial member, a pointer arm pivotally mounted on said structure and having a masking plate at one end thereof disposed to mask a predetermined area of the exterior of said dial member, a cam follower attached to said pointer arm and positioned to be actuated by the sides of said radial slot over a predetermined range of angular movement of said dial member and to be held fixed in position by the sides of said annular slot when said range is exceeded, and a plate positioned on said gimbal structure and having an aperture therethrough, said plate, masking plate and dial member being arranged such that said masking plate masks said dial member as viewed through said aperture until said dial member exceeds said range of angular movement.

6. An artificial horizon instrument as set forth in claim 5 wherein said pointer plate has an index thereon visible through said aperture and wherein said cam follower is at such a short moment arm from the pivot axis of said pointer arm that said masking plate moves at a predetermined multiple of said dial member angular speed.

7. An artificial horizon instrument as set forth in claim 5 further comprising a pin member rotatable with said dial member, and a pair of tabs on said pointer arm, each tab being positioned to be pushed by said pin member to rotate said pointer arm to a position where said cam follower will be forced into said radial slot when said dial member returns to within said range of movement.

8. An artificial horizon instrument for aircraft comprising an outer casing, a gimbal structure pivotally supported within said casing along the fore and aft axis thereof, a gyro rotor bearing member pivotally mounted along a transverse axis of said gimbal structure, a first gear positioned by said rotor bearing member, a second gear pivotally mounted on said structure and engaging said first gear, a horizon bar pivoted on said structure, a pin extending from said second gear substantially parallel with the pivot axis thereof and actuating said horizon bar, a substantially cylindrical dial member pivotally mounted on said structure and having dive and climb angle data on the exterior thereof, means responsive to the movements of said second gear for rotating said dial member, a pointer arm pivoted on said structure and having a masking plate at one end thereof disposed to mask a predetermined area of the exterior of said dial member, a cam structure on said dial member including an annular cam slot concentric with the pivot axis of said dial member and a radial slot having an open end merging with said annular slot, a cam follower attached to said pointer arm and positioned to be actuated by the sides of said radial slot over a predetermined range of angular movement of said dial member and to be held fixed in position by the sides of said annular slot when said range is exceeded, and a sky plate affixed to said gimbal structure and having an aperture therethrough, said horizon bar extending before said sky plate, and said dial member and masking plate being arranged such that said masking plate masks said dial member as viewed through said aperture until said dial member exceeds said predetermined range of movements.

9. An artificial horizon instrument as set forth in claim 8 further comprising a horizon plate carried before said sky plate by said horizon bar, said sky plate being distinctively shaded over substantially the entire half thereof below the level flight position of said horizon bar, and said horizon plate having a distinctive shading substantially the same as that of said sky plate over substantially the entire half thereof below said horizon bar.

10. An artificial horizon instrument for aircraft comprising a mounting structure pivotally supported by said aircraft along a fore and aft axis thereof, a horizon bar pivoted on said structure, a substantially cylindrical dial member pivotally mounted on said structure and having dive and climb angle data on the exterior thereof, a pointer arm pivoted on said structure and having a masking plate on one end thereof disposed to mask a predetermined area of the exterior of said dial member, a cam structure on said dial member including an annular cam slot concentric with the pivot axis of said dial member and a radial slot having an open end merging with said annular slot, a cam follower attached to said pointer arm and positioned to be actuated by the sides of said radial slot over a predetermined range of angular movement of said dial member and to be held fixed in position by the sides of said annular slot when said range is exceeded, a sky plate affixed to said structure and having aperture therethrough, said horizon bar extending before said sky plate, said dial member and masking plate being arranged such that said masking plate masks said dial member as viewed through said aperture until said dial member exceeds said predetermined range of movements, and means responsive to dive, climb and bank attitudes of said aircraft for rotatably positioning said structure and dial member and for actuating said horizon bar.

11

11. An artificial horizon instrument for aircraft comprising a mounting structure pivotally mounted along a fore and aft axis of said aircraft, a horizon bar pivoted on said structure, a substantially cylindrical dial member pivotally mounted on said structure and having dive and climb angle data on the exterior thereof, a pointer arm pivoted on said structure and having a pointer at one end thereof, a cam structure on said dial member including an annular cam slot concentric with the pivot axis of said dial member and a radial slot having an open end merging with said annular slot, a cam follower attached to said pointer arm and positioned to be actuated by the sides of said radial slot over a predetermined range of angular movement of said dial member and to be held fixed in position by the sides of said annular slot when said range is exceeded, a sky plate affixed to said structure and having an aperture therethrough, said horizon bar and said pointer extending before said sky plate, and said dial being arranged to be visible through said aperture, and means responsive to dive, climb and bank attitudes of said aircraft for rotatably positioning said structure and dial member and for actuating said horizon bar.

SAMUEL GABRIELSON.
EDWARD E. LYNCH.

REFERENCES CITED

The following references are of record in the file of this patent:

UNITED STATES PATENTS

| Number | Name | Date |
|---|---|---|
| 1,737,936 | Mercer | Dec. 3, 1929 |
| 2,450,874 | Braddon | Oct. 12, 1948 |
| 2,467,254 | Carlson | Apr. 12, 1949 |